Feb. 3, 1959  E. H. BUELL  2,871,982
LUBRICATING, COOLING AND OIL SEALING SYSTEM
FOR COUNTER ROTATING ENGINES
Filed Sept. 19, 1957  3 Sheets-Sheet 1
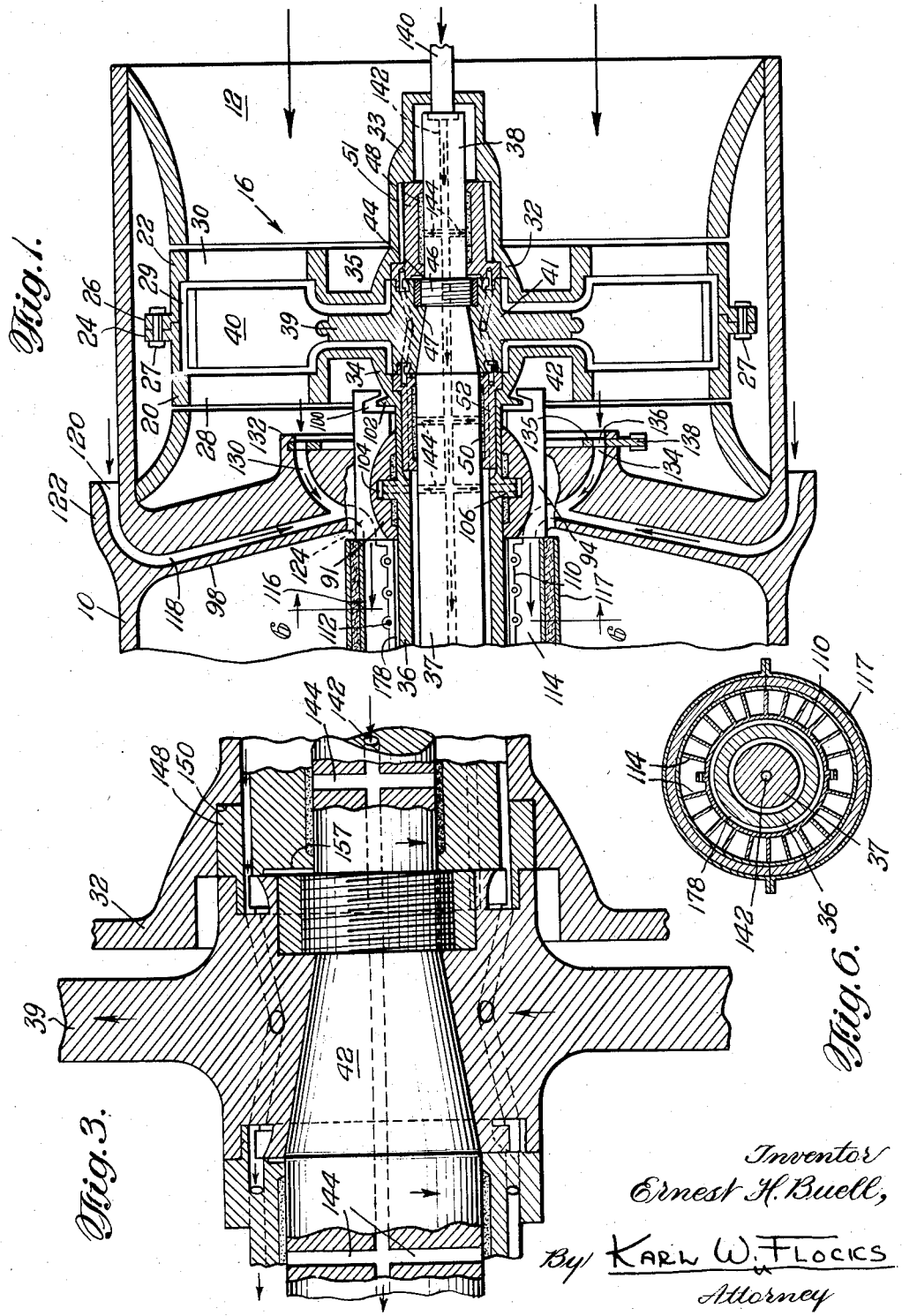
Inventor
Ernest H. Buell,
By Karl W. Flocks
Attorney Feb. 3, 1959 E. H. BUELL 2,871,982
LUBRICATING, COOLING AND OIL SEALING SYSTEM
FOR COUNTER ROTATING ENGINES
Filed Sept. 19, 1957 3 Sheets-Sheet 2
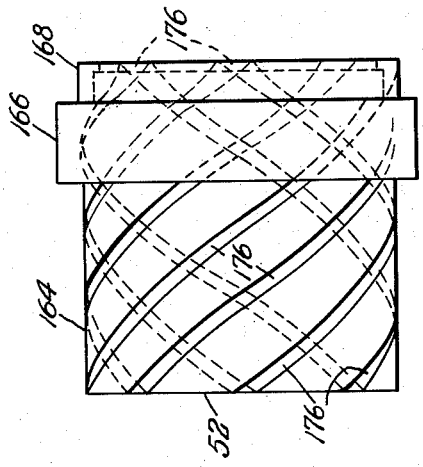
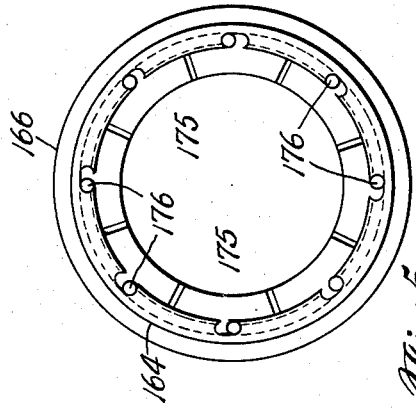
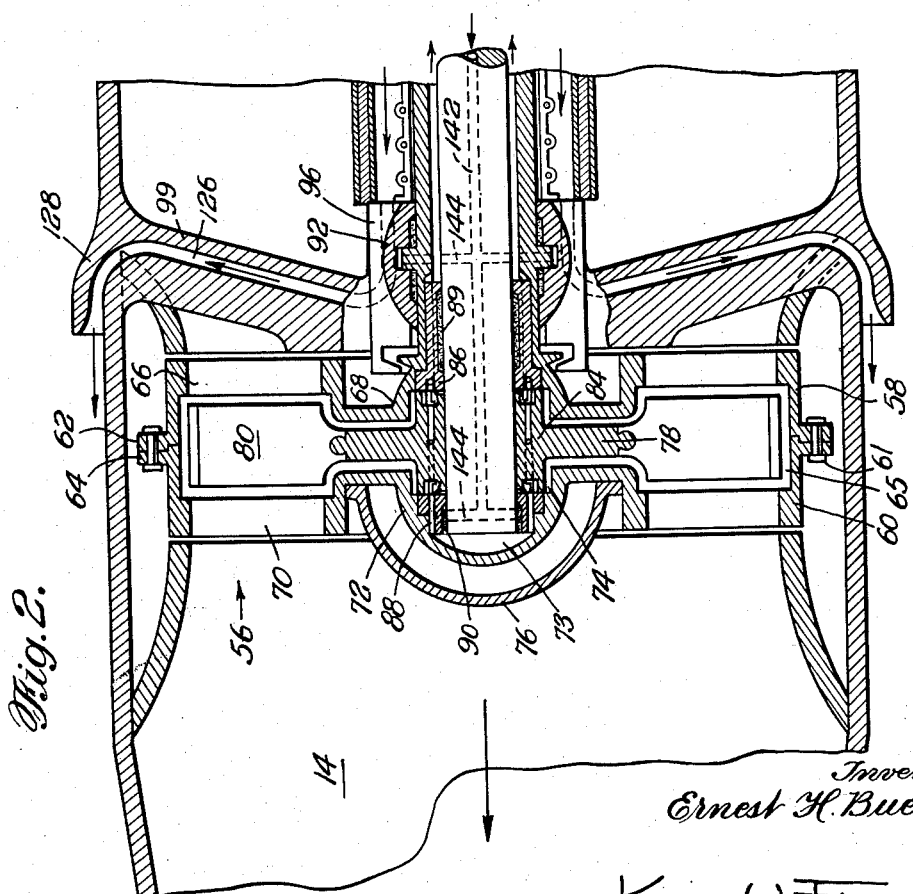
Inventor
Ernest H. Buell,
By Karl W. Flocks
Attorney

United States Patent Office 2,871,982
Patented Feb. 3, 1959

2,871,982

LUBRICATING, COOLING AND OIL SEALING SYSTEM FOR COUNTER ROTATING ENGINES

Ernest H. Buell, Altamont, N. Y.

Application September 19, 1957, Serial No. 685,002

19 Claims. (Cl. 184—6)

The present invention relates to jet propulsion apparatus. More particularly, the present invention relates to a cooling, lubricating and oil sealing system for use in a jet propulsion engine.

This application is a continuation-in-part of copending application Serial No. 412,534, filed February 25, 1954 for "Reverse Action Rotors for Use in a Jet Propulsion System" which has matured into Patent No. 2,812,898.

In the copending application referred to above, an aircraft jet engine is disclosed which includes contra-rotating shafts. It has been found in engines which utilize the counter-rotating principle that it is difficult to properly cool and lubricate the component parts thereof and particularly it has been found that the lubrication of the engine shaft bearings and cooling of the engine shafts has presented a problem that has not been successfully solved prior to the instant invention.

Accordingly, it is an object of the present invention to provide a lubricating, cooling and oil sealing system for jet propulsion apparatus that is effective in operation and relatively simple in principle.

Another object is to provide a lubricating system for high speed aircraft wherein the lubricating fluid is automatically pumped through the engine shaft bearings in accordance with the speed of the aircraft.

Another object is to provide a lubricating system for high speed aircraft wherein the lubricating fluid, being a very good conductor of heat, is used to carry the heat generated in the heart of this engine away by way of the slip stream, the heat being transferred to the casing to the fins, which will then liberate it to slip stream mentioned, the oil then being pumped to the supply tank, then drawn back to be used over in the same manner as before.

Still another object of the present invention is to provide a lubricating system for use in counter-rotating apparatus.

Still another object of the present invention is to provide a lubricating system for high-speed apparatus that is combined with the radial and thrust bearing system of the apparatus.

Still another object is to provide a lubricating system for a turbo-compressor system wherein the rotors are formed with diagonally extending pumping passages and the combination thrust and radial bearings are formed with helically extending pumping passages.

Other objects and the nature and advantages of the instant invention will be apparent from the following description taken in conjunction with the accompanying drawings, wherein:

Fig. 1 is a vertical sectional view of the compressor unit of the jet propulsion apparatus embodied herein illustrating the cooling and lubricating passages formed therein;

Fig. 2 is a vertical sectional view of the turbine unit of the apparatus embodied herein illustrating the cooling and lubricating passages formed therein;

Fig. 3 is an enlarged sectional view of a portion of the compressor rotor and shaft illustrated in Fig. 1;

Fig. 4 is an elevational view of the combination radial and thrust bearing shown in Fig. 1 and illustrating the helical lubricating grooves formed therein;

Fig. 5 is an end elevational view of the combination bearing shown in Fig. 4;

Fig. 6 is a sectional view taken along the line 6—6 in Fig. 1; and

Figure 7:
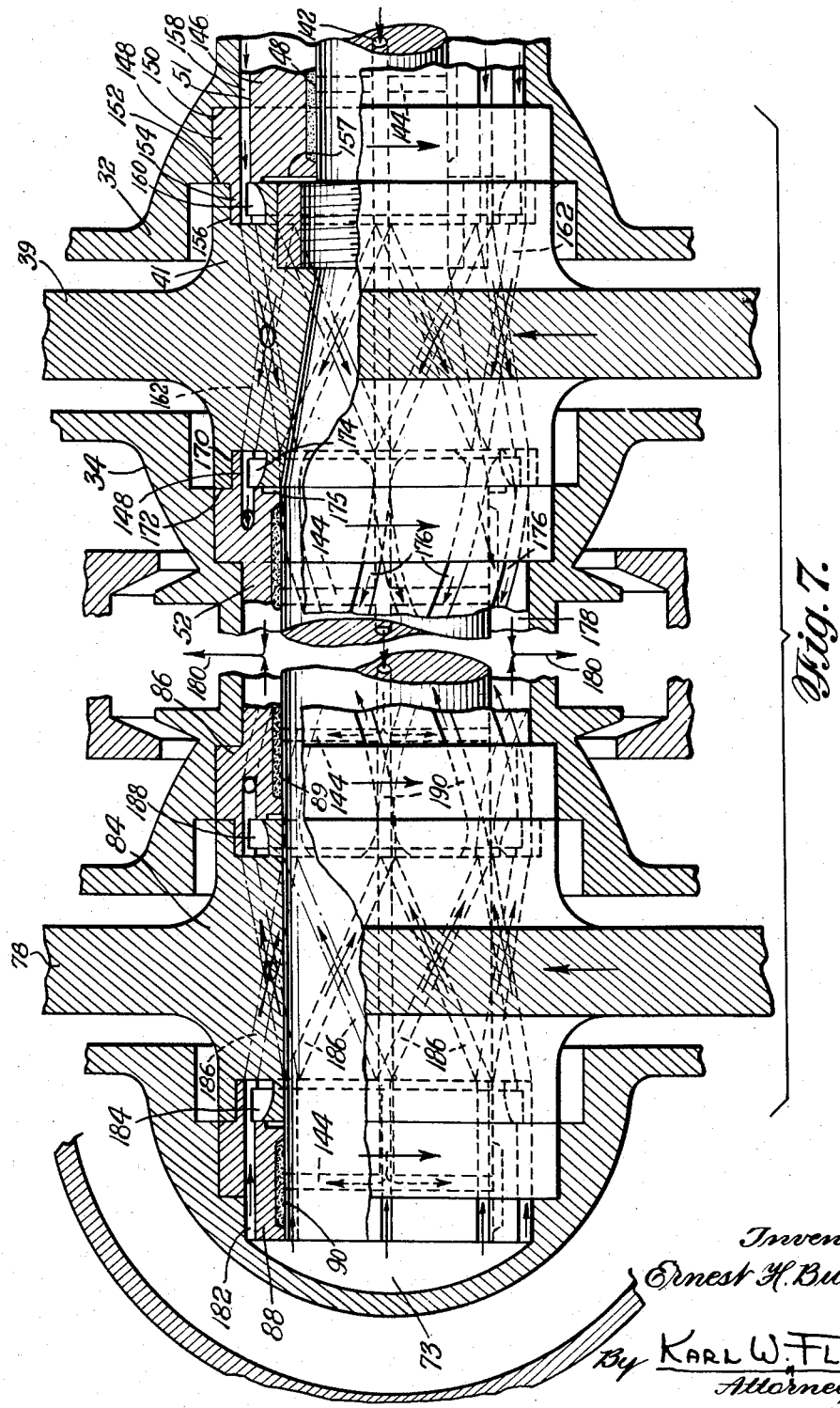
Fig. 7 is a vertical sectional view of enlarged portions of the compressor and turbine units with parts shown in elevation and illustrating the flow of fluid through the lubricating passages.

In copending application, Serial No. 412,534, a jet engine of the axial flow type illustrated and described therein, includes reversely rotating turbine rotors that are coupled to reversely rotating compressor rotors through coaxial shafts. The turbine and compressor rotors are similarly formed and are arranged such that the inner rotor of each unit is completely enclosed by the outer rotor thereof. Furthermore, the outer rotor of each unit is formed in two sections, one section being integral with the corresponding section of the adjacent unit, and the other section being formed as a separately cast element.

Referring now to the drawings, and particularly Figs. 1 and 2, the jet engine embodied herein is shown in part and the compressor and turbine units are respectively illustrated therein. Referring to Fig. 1, the jet engine includes a casing 10 having an inlet 12. Positioned adjacent the inlet 12 is the compressor unit indicated generally at 16, which includes an inner rotor and an outer rotor, the outer rotor being formed in two individual sections 20 and 22. The outer compressor rotor sections 20, 22 are formed with annular flanges 24, 26, respectively, which are secured together by body bolts 27. The rotor sections 20, 22 are thereby joined together as a unitary structure and define an annular recess 29 therebetween. Secured in the section 20 is an annular ring of blades 28, while the section 22 has secured therein a corresponding annular ring of blades 30. An annular hub portion 32 which includes as an extension thereof a hollow outer shaft 33 is shown formed integral with the section 22 of the outer compressor rotor. The section 20 of the outer compressor rotor has a corresponding annular hub portion 34 formed integral therewith which defines with the hub portion 32 a chamber 35 for receiving an inner compressor rotor hub, as will be described hereinafter. The hub portion 34 has formed integral therewith a hollow outer shaft 36 which receives an inner rotor shaft 37. The shaft 37, as shown, has a reduced end 38 which extends into the hollow outer shaft 33. The outer rotor sections 20, 22 define therebetween an opening in which is positioned an inner compressor rotor 39 having an annular ring of blades 40 secured thereto. The ring of blades 40 thereby form with the blade rings 28 and 30 an axial flow compressor for increasing the pressure of the air admitted through the inlet 12 and prior to being introduced into a combustion zone.

The inner rotor 39 is formed with a central hub 41 that is positioned in the chamber 35 defined by the hub portions 32 and 34, the hub 41 being secured to a tapered portion 42 of the inner shaft 37. The tapered portion 42 may include a keyway or spline of any convenient design that receives a corresponding key formed on the hub 41. The hub 41 is positioned on the tapered portion 42 of the inner shaft 37 and is secured thereto by a spanner nut 44 engaging a threaded portion 46 formed on the shaft 37, the spanner nut 44 fitting into a recess 47 formed in the hub 41.

In order to provide free rotation of the inner shaft 37 and reduced end 38 with respect to the outer shafts 36 and 33, bearings 48 and 50 are positioned in the shafts 33 and 36, respectively. The bearings 48 and 50 engage the inner shaft 37 and reduced end 38, respectively, and are disposed in combination thrust and radial bearings 51 and 52. The combination bearings 51, 52, which will be referred to as end bearings hereinafter, abut against the outer faces of the inner rotor hub 41 and thereby prevent lateral movement thereof. The inner rotor hub 41 and end bearings 51, 52 are provided with fluid passages which are adapted to direct lubricating fluid therethrough and a more detailed description of this construction is set forth hereinafter.

Referring now to Fig. 2, a turbine unit generally indicated at 56 is shown located downstream of the compressor unit 16 and immediately after a combustion area (not shown). The combustion products emitted from the combustion area are adapted to expand into the turbine unit 56 causing rotation of the turbine elements and are then exhausted through a restricted nozzle 14, to produce a reaction force. The turbine unit 56 comprises an outer turbine rotor similar in construction to the outer compressor rotor, the outer turbine rotor including outer turbine rotor sections 58 and 60, which are secured for rotation together by body bolts 61 engaging annular flanges 62 and 64. The turbine rotor sections 58, 60 are thereby joined together as a unitary structure and define therebetween an annular recess 65. The outer turbine rotor section 58 further includes an annular ring of blades 66 and is formed integral with a hub portion 68 which is integral with the outer shaft 36. The outer shaft 36 which extends from the hub portion 34 through the combustion chamber ring to the hub portion 68 thereby forms a unitary structure with the compressor rotor section 20 and the turbine rotor section 58. The outer turbine rotor section 60 also includes an annular ring of blades 70 and extends inwardly therefrom, being formed integral with a hub portion 72. The hub portion 72 is arcuate in configuration and is spaced from the end of the shaft 37 to form a chamber 73 which defines a reservoir for lubricating fluid, as will be described hereinafter. The hub portion 72 further defines with the hub portion 68 a chamber 74 which is adapted to receive a hub of the turbine inner rotor to be described hereinafter. Secured to the outer turbine rotor section 60 is an end member 76 which is formed in a hemispherical configuration and acts as a heat deflector for the outer turbine.

The outer turbine rotor sections 58, 60 are formed in a manner similar to that described above in connection with the outer compressor rotor and define therebetween the annular recess 65 in which is positioned an inner turbine rotor 78. The inner turbine rotor 78 has secured thereto an annular ring of blades 80 which are located between the blades 66 and 70 and form therewith a multistage turbine. The inner turbine rotor 78 is formed integral with a hub 84 which in turn is integrally cast or machined as an integral part of the shaft 37. As shown in Fig. 2, the hub 84 is positioned in the chamber 74 defined by the hub portions 68 and 72. By forming the inner turbine rotor 78, the hub 84 and the shaft 37 as an integral unit, the tendency of the hub to become loosened on the shaft at high temperatures and speeds will be prevented. The turbine unit will then be maintained in balance under all operating conditions and the safe operating time of the engine is thereby considerably extended.

In order to secure the inner turbine rotor 78 from lateral movement and to provide free rotation of the inner shaft 37 within the outer shaft 36 and hub portion 72, respectively, combination or end bearings 86 and 88 are secured in the outer shaft 36 and hub portion 72, respectively. The end bearings 86 and 88 are provided with enlarged thrust ends which engage the end faces of the inner turbine rotor hub 84 in the manner as described above in connection with end bearings 51, 52, thereby preventing lateral movement of the inner turbine rotor during rotation of the inner and outer shafts. The end bearings 86, 88 are also formed with annular recesses for receiving the shaft bearings 89 and 90 which are adapted to have the shaft 37 journalled therein.

In order to mount the outer shaft 36 for rotation in the casing 10, self-aligning bearings 91 and 92 are provided and are positioned in bearing housings 94 and 96, respectively (see Figs. 1 and 2). Referring to Fig. 1, the bearing 91 and housing 94 will be described, it being understood that bearing 92 and housing 96 include similar structure. The bearing housing 94 is formed in two parts which are secured together by suitable bolts which extend through the housing, the bolts thereby keeping the bearing 91 in perfect alignment. As seen in Fig. 1, the bearing housing 94 is secured to the casing 10 by bearing supports 98, the supports 98, 99 providing the necessary support for rotatably mounting the compressor and turbine units 16 and 56. Formed in the bearing housing 94 is an annular recess 100 which receives therein an annular oil flange 102 secured to the hub portion 34 and which is provided for forming an oil seal for lubricant supplied to the bearing 90. The bearing 90 in the housing 94 is furthermore formed with a thrust recess 104 which receives an annular thrust flange 106 formed on the shaft 36, the recess 104 and flange 106 being adapted to prevent lateral movement due to thrust exerted along the shaft 36. It is furthermore apparent from the bearing apparatus illustrated and described in connection with the shaft 36 that the shaft 36 will be prevented from lateral movement since the bearing housings 94, 96 are positioned in engagement with the enlarged hub portions 34, 68, respectively.

Since the power plant generates tremendous heat during operation, unless the rotating parts and parts adjacent the combustion chambers 53 are properly cooled, distortion will occur, eventually resulting in the gradual breakdown of the unit. In order to properly cool the critical elements subjected to high temperatures, a cooling system is provided that utilizes atmospheric air. Enclosing the outer shaft 36 and engaging the inner ends of the bearing housings 94 and 96 is a fixed shaft housing 110. The shaft housing 110 is formed in two identical halves which are bolted together by suitable bolts extending through the bolt holes 112. In order to direct cooling fluid in axial columns through the housing 110 and thereby provide for more effective cooling of the shaft 36, a plurality of radial partitions 114 are provided and are joined to the wall of the housing 110 (see Fig. 6). Coaxially disposed around the shaft housing 110 and spaced therefrom by the radial partitions 114 is a cylindrical housing 116 which is locked into position between the bearing housings 94, 96. Coaxially positioned around the housing 116 and spaced therefrom is a second cylindrical housing 117 which is also locked into position between the bearing housings 94, 96. As illustrated in Fig. 1, it is contemplated to insulate the space between the housings 116 and 117 with an insulating material such as asbestos. As shown more clearly in Fig. 1, the bearing supports 98 are formed as an integral part of the housing or casing 10 and have passages 118 formed therein, the passages 118 extending into an annular air intake duct 120 formed by a housing extension 122. The passages 118 communicate with passages 124 that extend through a portion of the bearing housing 94 which communicates with the passage 114, the passages 118 being adapted to conduct cooling air to the axial cooling passages formed by the partitions 114. Referring again to Fig. 2, the exhaust for the cooling air admitted to passage 114 is illustrated and includes passage 126 formed in the bearing supports 99, the passages 126 communicating with the axial cooling passages through suitable passages formed in the bearing housing 96. An annular exhaust duct 128 is formed in the casing 10 communicating with the passages 126 and is adapted to exhaust the cooling air admitted to the passages 114. When the engine is operating under normal conditions, air will be conducted through the intake duct 120 and conducted by passages 118 to the axial cooling passages defined by the partitions 114. The bearing housings 90, 92 and shaft housing 110, and the bearing supports 98 and 99 are thereby cooled, thus increasing the strength and durability of these elements and for all practical purposes eliminating distortion due to heat on the aft end of the turbine shaft and housing.

In order to properly cool the bearing supports and housing prior to the engine reaching its normal operating speed, a cooling by-pass is provided and includes passages 130 formed in the supports 98, the passages 130 communicating with the axial cooling passages through passages 124. As shown in Fig. 1, the supports 98 terminate in a shoulder 132 which is provided with a plurality of openings 134, each of the openings 134 communicating with the passages 130. A control plate 135 is rotatably secured around the bearing housing 94 and is formed with a plurality of openings 136 therein which are adapted to communicate with the openings 134. An operating arm 138 is secured to the plate 135 and may be manually or automatically controlled, as desired. When the engine is started or is idling, cooling air will be introduced into the passages 130 by the compressor unit 16, the control plate 135 having been rotated to register the openings 134 and 136. After the engine has reached normal operating speed, the control plate is actuated to move the openings 136 out of register with the openings 134, thereby closing the by-pass to the cooling passages. The cooling air is then received through duct 120 and passages 118 as discussed above.

The bearings for the inner and outer shafts 36, 37 are adapted to be lubricated at all times and for this purpose reduced portion 38 of the inner shaft 37 is provided with an inlet conduit 140 which receives lubricating oil under pressure from a suitable source. The conduit 140 is also operatively connected to a starter motor and thereby serves as a starter shaft. In describing the lubricating system, particular reference is made to Fig. 7, which illustrates the compressor and turbine bearing construction. Extending through the interior of the reduced portion 38 of the shaft 37 and the shaft 37 proper is a central passage 142 (Fig. 1) which is provided for distributing the lubricating oil to the shaft bearings. Communicating with the central passage 142 are a plurality of radially extending oil passages 144 which extend into the inner shaft bearings 48, 50 and 89, 90.

As shown in Fig. 7, the end bearing 51 is formed with a main body portion 146 in which the inner shaft bearing 48 is positioned. Joined integrally to the main body portion 146 is an enlarged portion 148 which is fitted in the hub portion 32, making contact with a shoulder 150 formed in the hub portion 32 and with a face 152 of the compressor rotor hub 41. Stepped down from the enlarged portion 148 and joined integrally thereto is an annular neck portion 154 that extends into an annular recess 156 formed in the face 152 of the compressor rotor hub 41. Formed in the outer face of the body portion 146 adjacent the annular reservoir 160 are a plurality of radially extending oil wipes 157. The oil wipes 157 are adapted to receive lubricating fluid therein which is drawn from the bearing 48 and maintains a film of oil in contact with the face 152 of the hub 41, thereby providing continuous lubrication between the counter rotating end bearing 51 and hub 41.

In order to circulate the lubricating fluid, thereby providing for continual use thereof, the end bearing 51 is formed with longitudinally extending passages 158 which communicate with an annular scoop-like chamber or reservoir 160 that is defined by the neck portion 154 and the hub recess 156. Formed in the hub 41 are diagonally extending passages 162 that communicate with the recess 156 and are adapted to receive lubricating fluid therefrom for transfer to the end bearing 52.

As illustrated in Figs. 4 and 5, the end bearing 52 is shaped similarly to end bearing 51 and includes a body portion 164 in which is formed an enlarged portion 166. Joined to the enlarged portion 166 is a neck portion 168, the neck portion 168 extending into a recess 170 formed in the left face 172 of the hub 41 as viewed in Fig. 7, the enlarged portion abutting against the face 172. Formed in the hub 41 is a chamber or reservoir 174 which communicates with the diagonal passages 162 and is adapted to receive the circulating lubricating fluid therefrom. Formed on the outer face of the body portion 164 are a plurality of oil wipes 175 (Fig. 5) which are similar to oil wipes 157 and which are adapted to retain lubricating fluid therein for maintaining an oil film between the end bearing 52 and the hub 41. As shown in Figs. 4 and 5, the end bearing 52 has formed on the surface of the body portion thereof a plurality of helically extending passages 176. The passages 176 extend through the enlarged portion 166, are exposed on the inner wall of the reduced portion 168, and communicate with the annular reservoir 174. As shown in Figs. 1 and 7, the passages 176 also communicate with an annular passage 178 formed between the outer surface of the shaft 36 and the inner surface of the shaft housing 110, the passage 178 communicating with a return passage (indicated by arrows 180) for recirculating the lubricating fluid to the point of origin.

Referring to Figs. 2 and 7, the end bearings 86 and 88 are shown abutting the turbine rotor hub 84 and as illustrated are formed in a manner similar to the end bearings 51, 52. Thus, end bearing 88 is formed similarly to end bearing 51 and is provided with longitudinally extending passages 182 that terminate in a reservoir 184. The reservoir 184 communicates with a plurality of diagonally extending passages 186, which, in turn, communicate with a reservoir 188 formed in a reduced portion of the end bearing 86. Communicating with the reservoir 188 and formed in the end bearing 86 in a manner similar to the passages 176 are a plurality of helically extending passages 190. The helically extending passages 190 also communicate with the passage 178 which is adapted to direct the lubricating fluid to the passage indicated by the arrow 180 in Fig. 7. Positioned in the end bearings 86 and 88 are the shaft bearings 89 and 90, respectively, in which the inner shaft 37 is journalled. Oil wipes similar to the oil wipes 157 and 175 are formed in the end bearings 86 and 88 and are adapted to receive lubricating fluid from the bearings 89 and 90 for maintaining a lubricating film between the end bearings 86, 88 and the hub 84.

*Operation*

The jet engine is initially started by a convenient starting motor operatively secured to the outer end of the shaft 140 or both rotating shafts. The outer compressor rotor and the inner compressor rotor are rotated in opposite directions since the blade rings of each rotor are formed with oppositely pitched blades. As the air is delivered under pressure to the combustion chambers, it is mixed with the fuel injected therein, and the resulting combustion products are propelled downstream into the turbine unit 56. The outer turbine rotor which is connected to the outer compressor rotor through the common shaft 36 is thus adapted to cause rotation of the outer compressor rotor. The inner turbine rotor 78, which rotates oppositely to the outer turbine rotor and is secured to the inner shaft 37, then rotates the inner compressor rotor 38 which is also secured to the inner shaft 37. It is apparent, therefore, that the outer compressor rotor and outer turbine rotor rotate as a unit in one direction, while the inner compressor rotor and inner turbine rotor rotate as a unit in the opposite direction, both units operating at the same speed due to the positioning of the inner rotor within the outer rotor.

During the operation of the engine, lubricating fluid is pumped in very large quantities into the unit through shaft 140 and passage 142. Inner shaft bearings 48, 50 and 89, 90 are continuously supplied with lubricating fluid through the radial passages 144 that communicate with the passage 142 while thrust bearings 91, 92 are also supplied with lubricating fluid from passage 142 through similar radial passages 144.

As the inner and outer rotors rotate at high velocity, lubrication is necessary between the thrust faces of the end bearings and their respective hubs. It is seen that the thrust faces are continuously supplied with lubricating fluid which filters through the shaft bearings that are supplied by the radial passages 144. In order to circulate the lubricating fluid, thereby providing for continual use thereof, the passages in the end bearings and hubs are provided. As seen in Fig. 7, the end bearings 51 and 52 rotate in the opposite direction to the compressor rotor hub 41. Since the passages 162 formed in the hub 41 extend diagonally therethrough, a vacuum is created at the corners of the hub and the lubricating fluid is thus drawn inwardly in the direction of the arrow (Fig. 7) through the longitudinal passages 158 formed in the end bearing 51. A low pressure area is thereby created at the corners of the hub 41 which forces the fluid to be withdrawn continuously from the shaft bearings into the oil wipes 157 and into the longitudinally extending passages. Since the scoop-like reservoir 160 provides communication between the passages 158 and the diagonally extending passages 162, the lubricating fluid will collect in the reservoir. The diagonally extending passages 162, which rotate oppositely to the laterally extending passages, effect a pumping action and the lubricating fluid is continuously removed from the reservoir 160 and pumped through the hub 41 in the direction of the arrows (Fig. 7). As the lubricating fluid collects in the scoop-like reservoir 174 formed in the hub 41, it is withdrawn by the rotating action of the oppositely rotating and helically extending passages 176 which are formed in the end bearing 52. The vacuum created between the face 172 of the end bearing 52 and the opposite face of the hub 41 causes the fluid to be sucked into the reservoir 174 and then into the helically extending passages. The lubricating fluid is then directed to the passage 178 and is pumped back to the point of origin by way of the passage indicated by arrow 180. The lubricating fluid supplied to the shaft bearings 89, 90 and end bearings 86, 88 by way of central passage 142 and radial passages 144 is also returned to the point of origin in a manner similar to that described above. As illustrated in Fig. 7, the lubricating fluid is directed to the longitudinally extending passages 182 by way of the end reservoir or chamber 73 which receives excess fluid and is drawn into the scoop-like reservoir 184. Fluid filtering through the end bearing inner face into the oil wipes is also withdrawn into the low pressure reservoir 184 from where it is directed into the diagonally extending passages 186 formed in the oppositely rotating turbine rotor hub 84. The scoop-like reservoir 188 formed in the hub 84 then receives the lubricating fluid and directs it into the helically extending passages 190. Since the end bearing 86 rotates oppositely to the rotor hub 84 a low pressure area is created around the hub faces, thereby directing the lubricating fluid in the direction of the arrows. As the lubricating fluid is exhausted from the helically extending passages 190, it enters the passage 178 from where it is returned for recirculation to the point of origin by way of the passage indicated by arrow 180.

It is seen that the lubricating system described herein rapidly circulates the lubricating fluid under the influence of the low pressure areas created by the helical passages in the end bearings 51 and 86 and the diagonal passages in the oppositely rotating rotor hubs 41 and 84. In order to more effectively recirculate the lubricating fluid the diameter of the passages progressively increases in the direction of flow. Thus, the diameters of the diagonal passages 162 and 186 are greater than the diameters of the longitudinal pasages 158 and 182, while the diameters of the helical passages 176, 190 are greater than the diameters of the diagonal passages 162 and 186. By constructing the passages in this fashion, and causing the end bearings and hubs to rotate oppositely, the pressures in the passages progressively decrease thereby creating a suction that is sufficient to rapidly direct the fluid toward the return passages.

It is further seen that by reason of the oppositely rotating hubs and end bearings the vacuum created at the hub corners will avoid the use of mechanical seals which are constantly subject to wear and replacement. The lubricating fluid, in addition to effectively lubricating the rotating elements, also acts to cool the elements that are subject to excessive temperatures normally present in high speed jet engines. Thus, the lubricating fluid supplements the cooling action of the cooling air admitted into the axial passages defined by partitions 114 and will aid in cooling the inner and outer shafts as well as the bearings. The cooling air also prevents the lubricant from becoming excessively heated and prevents accumulation of carbon deposits normally present in high speed aircraft lubricating systems. The oil passages are clear at all times due to the vacuum system employed and clogged oil passages are avoided.

Since the shafts and bearings are maintained at relatively low temperatures, due to the effective lubricating and cooling action of the lubricating fluid, there is less likelihood of structural failure when the engine is in operation. The lubricating system described herein is also completely self-contained and since recirculation of the fluid is continuous, a relatively small amount of fluid is necessary for use in the system. Because of the vacuum created at the thrust surfaces, oil leakage is prevented and frequent oil changes or addition of oil are avoided.

The lubricating system thus described herein is self-sealing and self-cooling and cooperates with the novel counter rotating turbo compressor system to form an effective and efficient jet engine.

It will be obvious to those skilled in the art that various changes may be made without dpearting from the spirit of the invention and therefore the invention is not limited to what is shown in the drawings and described in the specification but only as indicated in the appended claims.

What is claimed is:

1. In a turbo compressor system, an inner unit including a rotor and a shaft, an outer unit including a rotor and a shaft, said outer shaft positioned in coaxial relation with said inner shaft, end bearings located adjacent said inner rotor and supporting said inner shaft for rotation, said inner rotor having diagonally extending passages formed therein, longitudinal passages formed in one of said end bearings and communicating with said diagonally extending passages, and helical passages formed in the other of said end bearings and communicating with said diagonally extending passages, said end bearings rotating in a direction opposite to said inner rotor whereby lubricating fluid is pumped through said longitudinal passages in said first end bearing and into said diagonally extending passages in said inner rotor, and then into said helically formed passages in the other of said end bearings for return to the point of origin.

2. In a turbo compressor system, an inner unit including a rotor and a shaft, a counter rotating outer unit including a rotor and a shaft, said outer shaft positioned in coaxial relation with said inner shaft, end bearings positioned in said outer unit for supporting said inner unit, means for lubricating said end bearings, said lubricating means including longitudinally extending passages formed in one of said end bearings, diagonally extending passages formed in the inner unit rotor and communicating with said longitudinally extending passages, and helically extending passages formed in the other of said end bearings and communicating with said diagonally extending passages, said end bearings rotating in the opposite direction to said inner rotor whereby a pumping action is created to draw said lubricating fluid through said longitudinally extending passages, into said diagonal passages and then into said helical passages for returning said lubricating fluid to the point of origin.

3. A turbo compressor system comprising an inner unit including a rotor and shaft, a counter rotating outer unit including a rotor and shaft, spaced end bearings for supporting said inner unit for rotation, means for lubricating said bearings, said lubricating means including longitudinally extending passages formed in one of said end bearings, diagonally extending passages formed in said inner unit rotor and communicating with said longitudinally extending passages, and helically extending passages formed in the other of said end bearings and communicating with said diagonally extending passages, the counter rotation of said units creating a pumping action in said passages for rapidly circulating lubricating fluid therein as said longitudinal and diagonal passages and said diagonal and helical passages communicate with each other.

4. A turbo compressor system comprising an inner unit including a rotor and shaft, a counter rotating outer unit including a rotor and shaft, spaced end bearings for supporting said inner unit for rotation, means for lubricating said bearings, said lubricating means including longitudinal passages formed on one of said end bearings, helical passages formed in the other of said end bearings, and diagonal passages formed in said inner rotor and communicating with said longitudinal and helical passages, the counter rotation of said units causing a rapid pumping action in said passages for circulating lubricating fluid through said bearings, and means for directing said lubricating fluid to the point of origin.

5. A turbo compressor system as set forth in claim 4, wherein the faces of said inner rotor are formed with scooped out recesses, each of said end bearings including a reduced portion for interfitting in an adjacent recess in bearing relation therewith.

6. A turbo compressor system as set forth in claim 5, wherein a reservoir is formed in said recesses for collecting said lubricating fluid therein, said lubricating fluid thereafter being withdrawn in a direction away from the longitudinal center of said shafts.

7. A turbo compressor system comprising an inner unit including a rotor and shaft, an outer unit including a rotor and shaft, spaced end bearings supported in said outer unit and engaging said inner rotor in thrust relation therewith, shaft bearings disposed in said end bearings for journalling said inner shaft therein and means for lubricating said shaft bearings and end bearings, said lubricating means including an axial passage extending through said inner shaft, radial passages formed in said inner shaft and communicating with said axial passage for directing lubricating fluid to said shaft bearings, fluid passages formed in said end bearings and communicating with fluid passages formed in said inner rotor, said end bearing fluid passages and inner rotor fluid passages defining a pumping area for pumping said lubricating fluid therethrough to a point of origin for recirculation through said system.

8. A turbo compressor as set forth in claim 7, wherein the fluid passages formed in the end bearing on the upstream side of said inner rotor extend longitudinally therethrough and the fluid passages formed in the end bearing on the downstream side of said inner rotor extend helically therethrough.

9. A turbo compressor as set forth in claim 7, wherein said end bearings are provided with radial extending oil wipes on the thrust faces thereof, said oil wipes lubricating said thrust faces and metering said lubricating fluid to the adjacent helical passages.

10. In a turbo compressor system, an inner unit including a rotor and a shaft, a counter rotating outer unit including a rotor and a shaft, spaced end bearings supported in said outer unit and engaging said inner rotor, shaft bearings disposed in said end bearings for journalling said inner shaft therein, and means for lubricating said shaft bearings and end bearings, each of said end bearings including a body portion, an enlarged portion and a neck portion, said neck portion being received in a recess formed in the adjacent face of said inner rotor and thereby forming a thrust surface for said inner rotor.

11. In a turbo compressor system as set forth in claim 10, wherein said lubricating means includes longitudinal passages formed in one of said end bearings, helical passages formed in the other of said end bearings, said longitudinal and helical passages communicating with diagonal passages formed in said inner rotor, the communication of said passages producing a pumping action therein for rapidly circulating said lubricating fluid therethrough.

12. In a turbo compressor system as set forth in claim 11, which includes a first fluid reservoir formed in said inner rotor on the upstream side thereof and a second fluid reservoir formed in said inner rotor on the downstream side thereof, said first reservoir communicating with said longitudinal passages and directing lubricating fluid to said diagonal passages, and said second reservoir communicating with said helical passages and receiving fluid from said diagonal passages for circulation through said helical passages, said longitudinal and helical passages rotating oppositely to said diagonal passages whereby a pumping action is created when said passages communicate with each other.

13. In a turbo compressor system as set forth in claim 11, wherein the counter rotating units produce a vacuum area at the edges of said inner rotor to form an oil seal therearound.

14. In a turbo compressor system as set forth in claim 11, wherein the thrust faces of said end bearings are formed with radially extending grooves defining oil wipes, said oil wipes retaining lubricating fluid therein for lubricating said thrust faces and the adjacent motor face.

15. In a turbo compressor system, an inner unit including a rotor and a shaft, a counter rotating outer unit including a rotor and a shaft, spaced end bearings supported in said outer unit and engaging said inner rotor in thrust relation therewith, shaft bearings disposed in said end bearings for journalling said inner shaft therein, means for lubricating said shaft and end bearings and means for cooling said bearings and shaft, said lubricating means including longitudinal passages formed in the end bearing located upstream of said inner rotor, helical passages formed in the end bearing located downstream of said inner rotor, and diagonal passages formed in said inner rotor, said diagonal passages making periodic communication with said longitudinal and helical passages to create a pumping action in said passages for pumping a lubricating fluid therethrough.

16. In a turbo compressor system as set forth in claim 15, wherein said cooling means includes passage means for introducing air into said system and a plurality of axially extending passages surrounding said outer shaft for directing said air in heat exchange relation therethrough.

17. In a turbo compressor system as set forth in claim 16, wherein said cooling means further includes said lubricating fluid that circulates through said lubricating passages in heat exchange relation therewith.

18. In a turbo compressor system, a pair of counter-rotating units, each having a rotor and a shaft, bearings for supporting said units for rotation, means for lubricating said bearings including a first series of passages formed in a first set of said bearings, a second series of passages formed in the rotor of one of said units communicating with said first series of passages and rotating opposite thereto, and a third series of helical passages formed in another set of said bearings communicating with said second series of passages and rotated opposite thereto, the counter rotation of said units causing a rapid pumping action, in said passages for circulating lubricating fluid through said bearing means.

19. In a turbo compressor system, an inner unit including a rotor and a shaft, a counter rotating outer unit including a rotor and a shaft, spaced end bearings supported in said outer unit and having thrust faces formed on the ends thereof, and means for lubricating said end bearings, said lubricating means including a first series of passages formed in the rotor of said inner unit and passages formed in each of said spaced end bearings and communicating with said first series of passages, said first series of passages being of greater capacity than the passages formed in one of said spaced end bearings, and being of lesser capacity than the passages formed in the other of said spaced end bearings, whereby a vacuum is created at the thrust faces of said spaced end bearings to prevent oil leakage therefrom.

References Cited in the file of this patent

UNITED STATES PATENTS 2,457,999   Hulbert _____ Jan. 4, 1949